United States Patent [19]

Musselmann

[11] 4,252,640
[45] Feb. 24, 1981

[54] APPARATUS FOR SORTING FIBROUS STOCK SUSPENSIONS

[75] Inventor: Walter Musselmann, Heidenheim, Fed. Rep. of Germany

[73] Assignee: J. M. Voith GmbH, Fed. Rep. of Germany

[21] Appl. No.: 32,918

[22] Filed: Apr. 24, 1979

[30] Foreign Application Priority Data

Apr. 25, 1978 [DE] Fed. Rep. of Germany ....... 2818029

[51] Int. Cl.³ .......................... D21D 5/04; B04C 5/10
[52] U.S. Cl. ..................... 209/17; 209/211; 209/273
[58] Field of Search ................ 209/17, 211, 250, 273; 241/46.11, 46.17; 210/304, 415

[56] References Cited

U.S. PATENT DOCUMENTS

| | | | |
|---|---|---|---|
| 3,912,622 | 10/1975 | Bolton et al. | 209/273 X |
| 4,107,033 | 8/1978 | Holz | 209/17 |
| 4,165,841 | 8/1979 | Musselmann et al | 209/211 X |

FOREIGN PATENT DOCUMENTS 2548578 12/1977 Fed. Rep. of Germany .......... 209/273

*Primary Examiner*—Ralph J. Hill
*Attorney, Agent, or Firm*—Ostrolenk, Faber, Gerb & Soffen

[57] ABSTRACT

An apparatus for sorting a fibrous suspension for removing both heavy weight and light weight particulate impurities is disclosed. An antechamber is positioned above a main chamber. Fibrous stock suspension is inletted tangentially to the antechamber and moves down to the main chamber. An annular rotor in the main chamber creates a vortex of the fibrous stock suspension, which drives the heavier particulate impurities to the side wall of the main chamber and moves the lighter weight impurities toward the center of the vortex. The heavier weight impurities fall to the bottom of the main chamber from which they are removed. The lighter weight impurities are removed by a drainage line extending toward the center of the antechamber. Above the rotor is a strainer and the rotor cooperates with the strainer to drive purified fluid suspension to an annular outlet chamber surrounding the bottom of the antechamber and from there into an outlet line.

18 Claims, 2 Drawing Figures

APPARATUS FOR SORTING FIBROUS STOCK SUSPENSIONS

BACKGROUND OF THE INVENTION

This invention relates to apparatus for sorting fibrous stock suspensions, e.g. of wood pulp, particularly for eliminating particulate impurities.

In many operations performed in connection with suspensions of fibrous material in a liquid, it is desirable to treat the suspension of fibrous material to provide a resultant suspension which contains fibers that are free of impurities.

A known structure for sorting fibers and for removing impurities comprises a closed container, preferably operating in a vertical condition and preferably having a structure which is generated around an axis of rotation. The structure may thus be in part conical, in part cylindrical and in part of other shapes which are, however, symmetrical about the vertical axis.

An inlet line opens tangentially into the container. A device is provided to form a vortex in any liquid which is injected tangentially into the container. The vortex creating device is preferably a rotor within the container. The rotor is located adjacent a strainer through which the treated, fibrous stock suspension is caused to pass to an outlet line.

The container is also provided with a plurality of discharge openings. One of the discharge openings discharges fluid containing impurities which are relatively heavy. Another discharge opening delivers fluid containing impurities which are relatively light. An outlet delivers fluid free of the heavy and light weight impurities.

Because a vortex is created, the heavier impurities are driven by centrifugal force to the circumferential area of the container where the outlet for the heavy impurities is located. The light weight impurities are driven by the vortex to another area, preferably at the center of the vortex where the fluid carrying these particles may pass through another outlet. The remaining fluid which has thus been purified of the contaminants passes through the outlet.

A device of the above kind has been described for example in Austrian Application No. 9203/76. In that device, the fibrous stock suspension is treated in the container for removal of impurities. In that prior device, fibers which had not yet been broken down were beaten further by the rotor in the container and were then forced through a strainer located just downstream of the rotor in the flow path. The supply line delivered fiber suspension upstream of the rotor. Due to the tangential inlet direction of the suspension to be purified and to the operation of the rotor, centrifugal force was produced by means of which the heavier impurities were conducted principally down along the container wall to a discharge opening. Light weight impurities gathered in the vicinity of the longitudinal axis of the container and were drawn off from there through the hollow shaft of the rotor.

However, this prior device has the disadvantage that impurities, and particularly the light weight impurities, were also broken down by the rotor so that it was possible for them to pass through the strainer and thus remain in the supposedly purified fibrous stock suspension.

BRIEF DESCRIPTION OF THE INVENTION

The object of the present invention, therefore, is to provide a device of the type described above in which it is possible to achieve a better initial separation of impurities or contaminants, consisting of both heavy and light weight particulates, from the fibrous stock suspension supplied to the device.

In accordance with the present invention the container above described comprises an annular symmetrical antechamber into which the inlet line opens, preferably tangentially. A drainage line for light weight impurities extends into the antechamber in such a manner that the light weight impurities are removed from the container before they can contact the rotor and be undesirably broken by the rotor to thereafter pass through the strainer and exit with the supposedly purified suspension. A main chamber is provided adjacent the antechamber and preferably below it. A rotor is located between the antechamber and the main chamber. The rotor is provided with through passages for the fiber suspension.

The suspension flowing into the antechamber is both sucked into the container and is then moved onward and its rotary movement is enhanced by the rotor disposed between the antechamber and the main chamber. The rotor cooperates with the possible tangential entry of the suspension to create the vortex above described. Owing to their weight, the heavy particulate impurities are conducted by centrifugal force to the circumferential wall of the container from which they can be removed from the container through a suitably arranged discharge.

The light weight impurities having been removed the antechamber and the heavy weight impurities having been removed by passage through the main chamber, the purified suspension is forced through a strainer after any lumps have been appropriately removed by the rotor, if necessary. The purified suspension now leaves the container through an outlet line, and inlet to the outlet line may be through a third chamber, annularly arranged, preferably around the antechamber.

An advantageous development of this invention comprises the rotor shaft extending up through the main chamber from the lower end. The rotor shaft does not, therefore, extend into the antechamber which thus remains free from a disturbing rotor shaft. The light weight impurities can thus be removed from the vortex in the antechamber in a simple way by means of the centrally located vertical drainage line which extends upwardly.

The creation of the vortex is enhanced by placing a sleeve on the top or downstream side of the rotor at the lower end of the antechamber. This sleeve further strengthens and stabilizes the center of the vortex which is established in the antechamber in the area of the longitudinal axis of the apparatus owing to the centrifugal forces which are generated. The light weight particulate impurities gather at the center of the vortex created in the antechamber. Separation of light weight particles is improved by this.

The foregoing and other objects and features of the present invention will become apparent in the following description and accompanying drawings.

DESCRIPTION OF A PREFERRED EMBODIMENT

Figure 1:
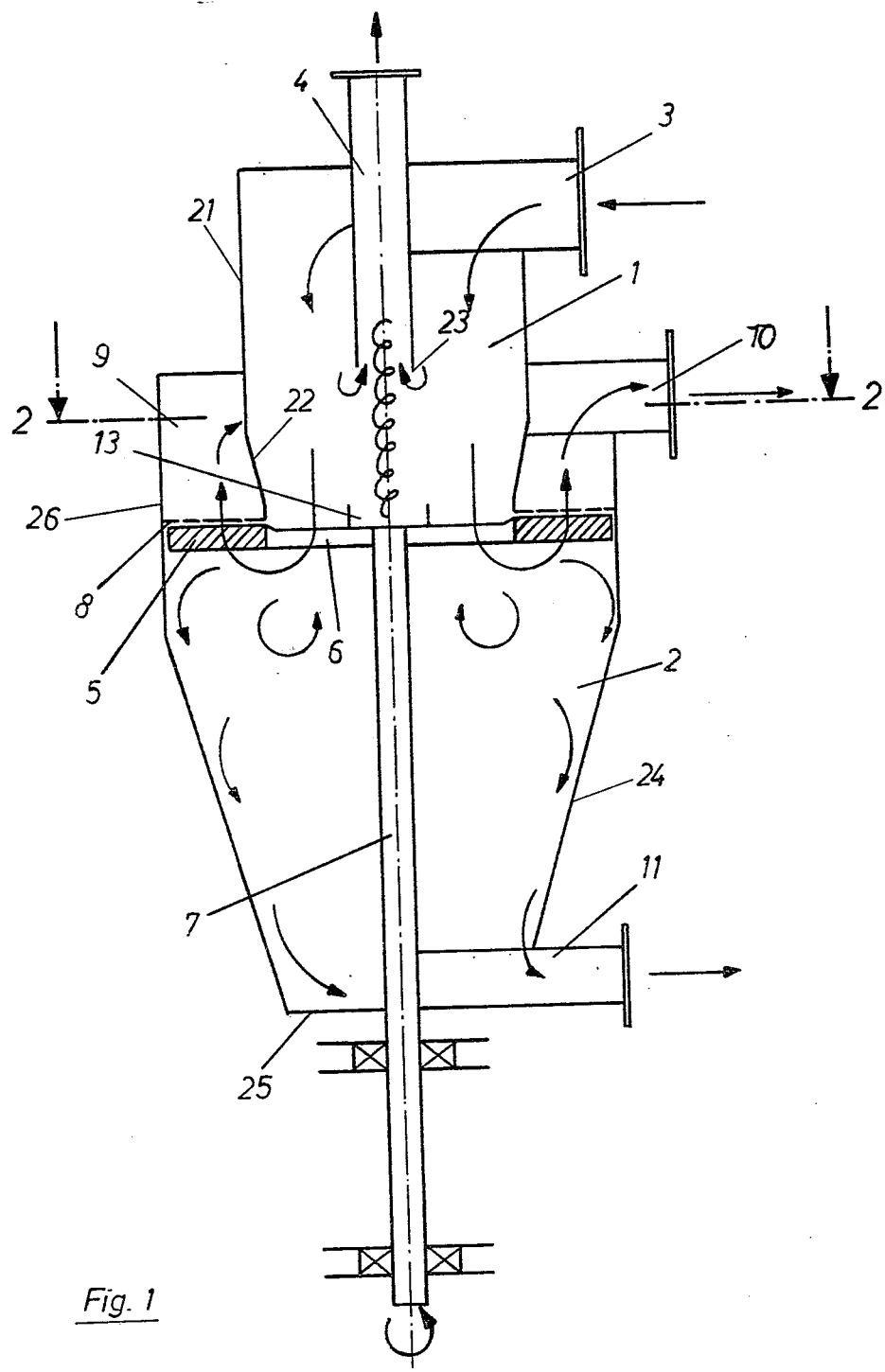
FIG. 1 is a vertical, sectional, schematic view of the appartus of the present invention.
Figure 2:
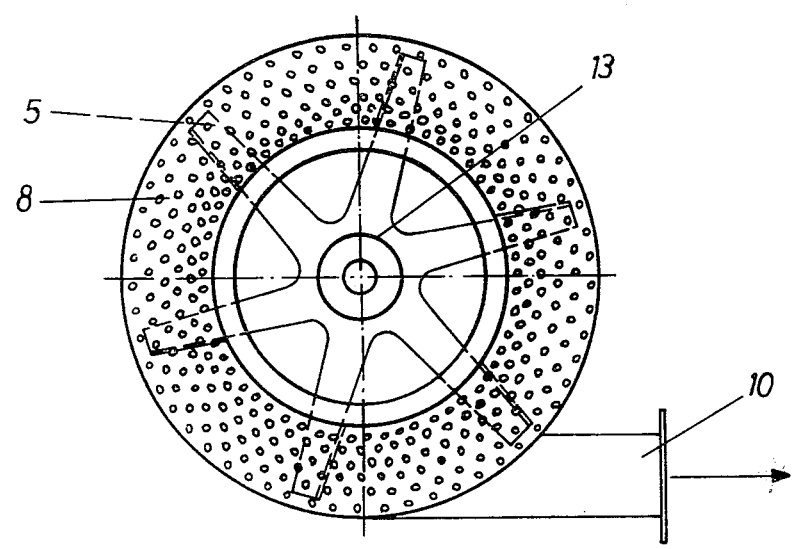
FIG. 2 is a horizontal sectional view taken from line 2—2 of FIG. 1 looking in the direction of the arrows.

The suspension purification apparatus shown in the Figures comprises an upper antechamber 1 and a lower main chamber 2. The apparatus is preferably operated in the illustrated vertical state. A supply line 3 for the liquid fibrous stock suspension, such as a suspension of wood pulp, which suspension is to be purified, enters tangentially into the antechamber 1 through tangential supply line 3.

The antechamber 1 is defined by a respective annular sidewall 21 having a tapering bottom section 22. The antechamber 1 has a vertically oriented drainage line 4 extending into it for removal of light weight particulate impurities. Drainage line 4 extends along the axis of the antechamber and opens at its bottom 23 at slightly below the center of the antechamber.

The main chamber 2 is conical in shape with the diameter of its sidewall 24 tapering toward the bottom 25. The cylindrical upper section 26 of the main cylinder sidewall surrounds the antechamber sidewall section 22, as discussed further below.

A rotor 5 is located beneath the antechamber 1 between the antechamber 1 and the main chamber 2. The rotor 5 is provided with at least one large through passage 6 for the fibrous stock suspension. The rotor is in the form of an annular array of rotor elements The spaces between rotor elements defines the passage 6. Thus, the rotor is radially outside the antechamber. The rotor 5 is rotated by a rotor shaft 7 extending along the axis of main chamber 2 in response to a drive which is not shown. A strainer 8 is provided adjacent the lower end of the antechamber and extending radially outwardly from the antechamber 1. The rotor 5 is also arranged radially outwardly of the antechamber and at a short distance below the strainer 8 to form a zone between the strainer and the rotor for removal of lumps of fiber in the suspension.

Above and thus downstream of the strainer 8, an annular collecting area 9 is provided, which surrounds the lower part of the antechamber 1. This annular collecting area receives the cleaned fibrous stock suspension after it has passed through the strainer. An outlet 10 is provided from the annular area or chamber 9 for the new cleaned fibrous stock suspension.

A vortex is initially created in part by the tangential entry of the fiber stock suspension through the tangential supply line 3. The vortex is enhanced by the utilization of the rotating rotor.

The top of the rotor is provided with an annular, narrow diameter sleeve 13, which acts as a further support for the vortex which is formed and which also helps the lighter weight particles to be driven toward the center of the antechamber 1 for access to the drainage line 4.

The light weight impurities gather at the center of the generated vortex and are removed from the container through the drainage line. Any light weight impurities remaining in the suspension after it has moved into the main chamber 2 tend to accumulate in the center of the main chamber, near the rotor shaft and then settle down through the conical section and are removed at bottom outlet 11 of the chamber 2.

At the lower end 25 of the main chamber 2, the discharge opening 11 is provided, principally for the heavier impurities.

In operation the fibrous stock suspension flowing into the antechamber 1 is set in rotary motion initially by the tangential arrangement of the supply line 3. The operation of the rotor 5, and particularly of the sleeve 13, serves to maintain this rotary motion and forms a vortex. The light weight impurities gather in the center of the vortex in the antechamber and are removed through the drainage line 4 at the antechamber 1. The fibrous stock suspension moves out of the antechamber 1 through open areas 6 of the rotor and the rotor simultaneously increases the rotary motion of the suspension. The fibrous stock suspension then enters the main chamber 2 in which the heavier impurities are driven to the chamber side wall and spin with the liquid suspension, down along the tapering circumferential wall 24 of the main chamber 2 and ultimately through the discharge opening 11. Since the liquid is in turbulent condition in chamber 2 owing to the operation of the rotor, liquid which no longer has the heavier particles and no longer has the lighter weight particles passes through a zone which is located between the rotor 5 and the strainer 8 and this passage serves to remove or chop up lumps. The now purified suspension is forced through the strainer 8 and arrives in the annular chamber or collecting area 9, from which it then exits through the outlet 10. The light weight impurities which have not been separated from the suspension in the antechamber arrive in the main chamber and accumulate in the vicinity of the rotor shaft 7 and then pass down along the outside of the shaft to the discharge opening 11.

In a variation of the present invention, if it is desired to keep the main chamber 2 free from any components at all, the rotor shaft can be passed through the top of the antechamber 1 into the main chamber 2. In this case, the rotor shaft would be constructed as a hollow shaft having an opening at the lower end thereof through which the light weight impurities may be conducted away, as with drainage outlet 4.

In the foregoing, the present invention has been described solely in connection with preferred illustrative embodiments thereof. Since many variations and modifications of the present invention will now be obvious to those skilled in the art, it is preferred that the scope of this invention be defined not by the specific disclosures herein contained but only by the appended claims.

What is claimed is:

1. Apparatus for sorting a fibrous stock suspension for removing particulate impurities therefrom, comprising:
   an antechamber and a main chamber, in direct communication with each other; said chambers both having a longitudinal axis;
   a fibrous suspension inlet to said antechamber and aimed such that said suspension inlet enters tangentially to said antechamber and such that the suspension enters said antechamber tangentially for generating a vortex in the suspension in said antechamber;
   said main chamber having a bottom; a discharge conduit for heavier particulate impurities near said bottom of said main chamber;
   a drainage line for light weight particulate impurities, and having an inlet in the vicinity of said antechamber longitudinal axis;
   a rotor located in the vicinity of the communication between said antechamber and said main chamber for creating and maintaining a vortex in the suspension, which vortex causes heavier impurities to be driven to the side of said main chamber and thereafter to move down to said discharge conduit and which causes light weight impurities to be driven toward the center of the vortex, and said drainage line being positioned for removing the light weight impurities from there; said rotor including through passage means therethrough for suspensions; means for rotating said rotor; and outlet means for outlet of cleaned suspension which is drawn from said main chamber and driven by said rotor.

2. The apparatus of claim 1, further comprising said rotor being provided with a sleeve which projects into said antechamber for aiding in support of the vortex.

3. The apparatus of either of claims 1 or 2, wherein siad antechamber and said main chamber have a common longitudinal axis and said rotor has an axis that is parallel thereto.

4. The apparatus for sorting a fibrous suspension of claim 1, further comprising a strainer located between said rotor and said outlet means.

5. The apparatus for sorting a fibrous suspension of claim 4, wherein said strainer defines a bottom entrance for said outlet means.

6. The apparatus for sorting a fibrous suspension of claim 1, wherein said antechamber is defined by an annular side wall that terminates at said main chamber; said rotor being at said termination of said antechamber wall; said outlet means chamber being outside said antechamber wall.

7. The apparatus for sorting a fiber suspension of claim 1, wherein said outlet means comprises a chamber communicating from the side of said rotor facing out of said main chamber, and being outside said antechamber, and said outlet means chamber leading to an outlet line.

8. The apparatus for sorting a fibrous suspension of claim 7, wherein said antechamber is defined by an annular side wall that terminates at said main chamber; said rotor being at said termination of said antechamber wall; said outlet means chamber being outside said antechamber wall.

9. The apparatus for sorting a fibrous suspension of either of claims 1, or 4, wherein said antechamber is above said main chamber and said rotor is vertically approximately between said main chamber and said antechamber.

10. The apparatus for sorting a fibrous suspension of claim 9, wherein said main chamber and said antechamber are both generally annular bodies.

11. The apparatus for sorting a fibrous suspension of claim 9, wherein said main chamber tapers narrower down toward said bottom thereof.

12. The apparatus for sorting a fibrous suspension of claim 7, wherein said outlet means comprises a chamber communicating from the side of said rotor facing out of said main chamber, and being outside said antechamber, and said outlet means chamber leading to an outlet line.

13. The apparatus for sorting a fibrous suspension of claim 12, wherein said antechamber is defined by an annular side wall that terminates at said main chamber; said rotor being at said termination of said antechamber wall; said outlet means chamber being outside said antechamber wall.

14. The apparatus of claim 13, further comprising said rotor being provided with a sleeve which projects into said antechamber for aiding in support of the vortex.

15. The apparatus for sorting a fibrous suspension of claim 13, wherein said rotor is annular and includes a suspension impelling portion which is radially outside said antechamber wall.

16. The apparatus of claim 15, further comprising said rotor being provided with a sleeve which projects into said antechamber for aiding in support of the vortex.

17. The apparatus for sorting a fibrous suspension of claim 13, wherein said strainer defines a bottom entrance for said outlet means chamber.

18. The apparatus for sorting a fibrous suspension of claim 17, wherein said rotor and said strainer are spaced such that lumps of particulate material or suspension trapped between them are broken up to be able to pass through said strainer to said outlet means.

* * * * *